United States Patent [19]
Serra

[11] 4,423,687
[45] Jan. 3, 1984

[54] SAFE DEPOSIT BOX ANCHORING SYSTEM

[75] Inventor: Henry Serra, Novato, Calif.

[73] Assignee: Hermann Associates, Inc., San Francisco, Calif.

[21] Appl. No.: 207,860

[22] Filed: Nov. 18, 1980

[51] Int. Cl.³ .......................... E05G 1/08; F16B 12/00; B65D 21/00

[52] U.S. Cl. .......................................... 109/50; 312/111; 206/503; 414/114

[58] Field of Search .................. 220/23; 206/821, 509, 206/503; 211/264, 69, 194, 126, 128; 312/111; 109/53, 79, 50, 52; 414/114, 786

[56] References Cited

U.S. PATENT DOCUMENTS 907,507 12/1908 Kerr .
1,626,482 4/1921 Sargent .
2,343,525 5/1942 Blodgett .............................. 312/111
3,974,898 8/1976 Tallis et al. .
4,065,014 12/1977 Sagmiller .

*Primary Examiner*—Gene Mancene
*Assistant Examiner*—John Weiss
*Attorney, Agent, or Firm*—Townsend and Townsend

[57] ABSTRACT

A system that prevents stacked safe deposit box nests from shifting horizontally relative to one another utilizes registered pluralities of retainer brackets mounted along the upper and lower edges of the rear wall of the nest. The retainer brackets are configured with a central portion that is spaced away from the nest wall to define a vertically opening passageway. The retainer brackets along the lower edge of an overlying nest may then be aligned with the retainer brackets along the upper edge of an underlying nest by bringing the two nests into precise registration. A locking member is then passed through each aligned pair of retainer brackets.

7 Claims, 5 Drawing Figures

SAFE DEPOSIT BOX ANCHORING SYSTEM

FIELD OF THE INVENTION

The present invention relates generally to container placement, and more specifically to the alignment and anchoring of safe deposit box nests.

BACKGROUND OF THE INVENTION

Almost every bank provides, for a rental fee, the use of safe deposit boxes wherein patrons may safely store valuables. In order to provide the bank a degree of flexibility in the configuration of individual safe deposit boxes, it has become customary to group individual safe deposit boxes in modular units, called "nests", which are stacked side-by-side and atop one another from floor to ceiling in the bank vault.

A safe deposit box nest generally assumes the form of a steel or aluminum enclosure having a plurality of compartments, each of which has a double locking door. Each compartment contains an insert container in which the safe deposit box renter keeps valuables. The nests are configured to have a convenient size and weight. A horizontal depth of 24 inches is standard, with a width of 35⅝ inches and a height of 17 inches being typical. While there is variation in the construction details of safe deposit box nests, a common construction utilizes ¼-inch thick mild steel for the top, bottom, rear wall, and side walls and ½-inch thick mild steel for the door. While some nests are characterized by a flush bottom surface, some of the newer ones achieve certain economies by constructing the nest of relatively thicker material (e.g., ¼-inch) in a band near its front and relatively thinner material (e.g., ⅛-inch) elsewhere. This requires spaced square shims at the rear corners of the bottom surface in order to level the nest. A typical weight for an empty nest is in the range of 250 to 700 pounds.

Certain geographic locations are prone to earthquakes, and there have been devised methods of securing the nests to avoid the possibly catastrophic consequences of a falling nest. The need for such methods is especially great for the newer nests described above, since the area of contact between an upper and lower nest of that type is limited to the area of the band and shims (about 15% of the total horizontal area).

One solution is to anchor the nests to the walls of the vault. However, the nests may then become part of the building property which is often undesirable from the bank's point of view. It is also known to bolt an overlying nest to an underlying nest at the corresponding adjacent corners. However, such a system of securing the nests has the disadvantage that access to the inside of the nest is required. It can be appreciated that it is not always easy, or even possible, to contact the renter of the box in order to gain such access. This problem may be somewhat alleviated by making the bolts of sufficiently small cross section that they are sheared when the nests are pried apart. It is still necessary, however, to gain access for reinstallation of the bolts. Moreover, any system (such as this) that entails a physical penetration of the nests may be undesirable for security reasons.

SUMMARY OF THE INVENTION

The present invention provides a surprisingly simple and effective system that prevents stacked safe deposit box nests from shifting horizontally relative to one another. The system does not require access to the inside of the nest for installation or removal, is self-actuating, and does not hinder in any way the separation of stacked nests when such separation is desired.

In its broadest form, the present invention utilizes registered pluralities of retainer brackets mounted along the upper and lower edges of the rear wall of the nest. The retainer brackets are configured with a central portion that is spaced away from the nest wall to define a vertically opening passageway. The retainer brackets along the lower edge of an overlying nest may then be aligned with the retainer brackets along the upper edge of an underlying nest by bringing the two nests into precise registration. A locking member is then passed through each aligned pair of retainer brackets.

The locking member is preferably in the form of a tab formed of sheet material, being sized for a sliding fit into the passageway. The tab is formed with a flange to define the maximum downward movement. When fully engaged, the tab extends sufficiently below the line of contact between the nests to provide the required degree of horizontal stabilization. The nests are constrained against sideways and fore-and-aft movement.

It should be realized that the nests are normally positioned with their rear walls less than about an inch from the vault wall. Thus access to the rear of the installed nests is generally impossible. However, the present invention operates without requiring access to the rear. Installation of an overlying nest over an underlying nest may be effected accoding to the following procedure. The overlying nest is placed over the underlying one so that the side walls of both are in coplanar relationship, but is not pushed all the way back. The tabs are placed in the lower retainer brackets of the overlying nest, but do not fully seat themselves since they encounter the upper surface of the underlying nest. The overlying nest is then pushed back to a point where the rear walls of the two nests are coplanar, at which time the tabs drop gravitationally so that the lower portions of the tabs engage the upper retainer brackets of the underlying nest, thus effecting a positive locking.

Unlocking of a registered engaged pair of nests is carried out in the context of a normal procedure wherein a steel wedge is driven between the nests from the front, and a steel roller inserted into the clearance at a point about halfway back. Once the wedge is removed, the front of the nest is easily lowered with the roller acting as a fulcrum. The rear of the nest may be raised by a distance determined by the roller diameter and location. As the rear of the overlying nest moves up, the tabs are pulled out of the brackets on the underlying nest. The tabs are sized so that their lower edges clear the upper surface of the underlying nest as the overlying nest pivots about the roller. The overlying nest may then be rolled toward the front for removal and relocation. The specific tab dimensions will typically depend on the roller diameter. It has been found that a ½-inch downward extension of the fully seated tab below the lower surface of the overlying nest works well with the ½-inch diameter rollers commonly used. This provides sufficient horizontal stabilization while allowing separation of the nests as outlined above.

The present invention has the advantage of avoiding connection to the vault walls. Thus the nests do not become part of the building property. The present invention has the additional important advantage that it is applicable to virtually any type of safe deposit box nest. As such, existing arrays of nests may be retrofitted to take adavantage of the present invention. Penetration of the nests is not required; thus security is left inviolate. For a further understanding of the nature and advantages of the present invention, reference should be made to the remaining portions of the specification and the appended drawings.

DESCRIPTION OF THE PREFERRED EMBODIMENTS

Figure 1:
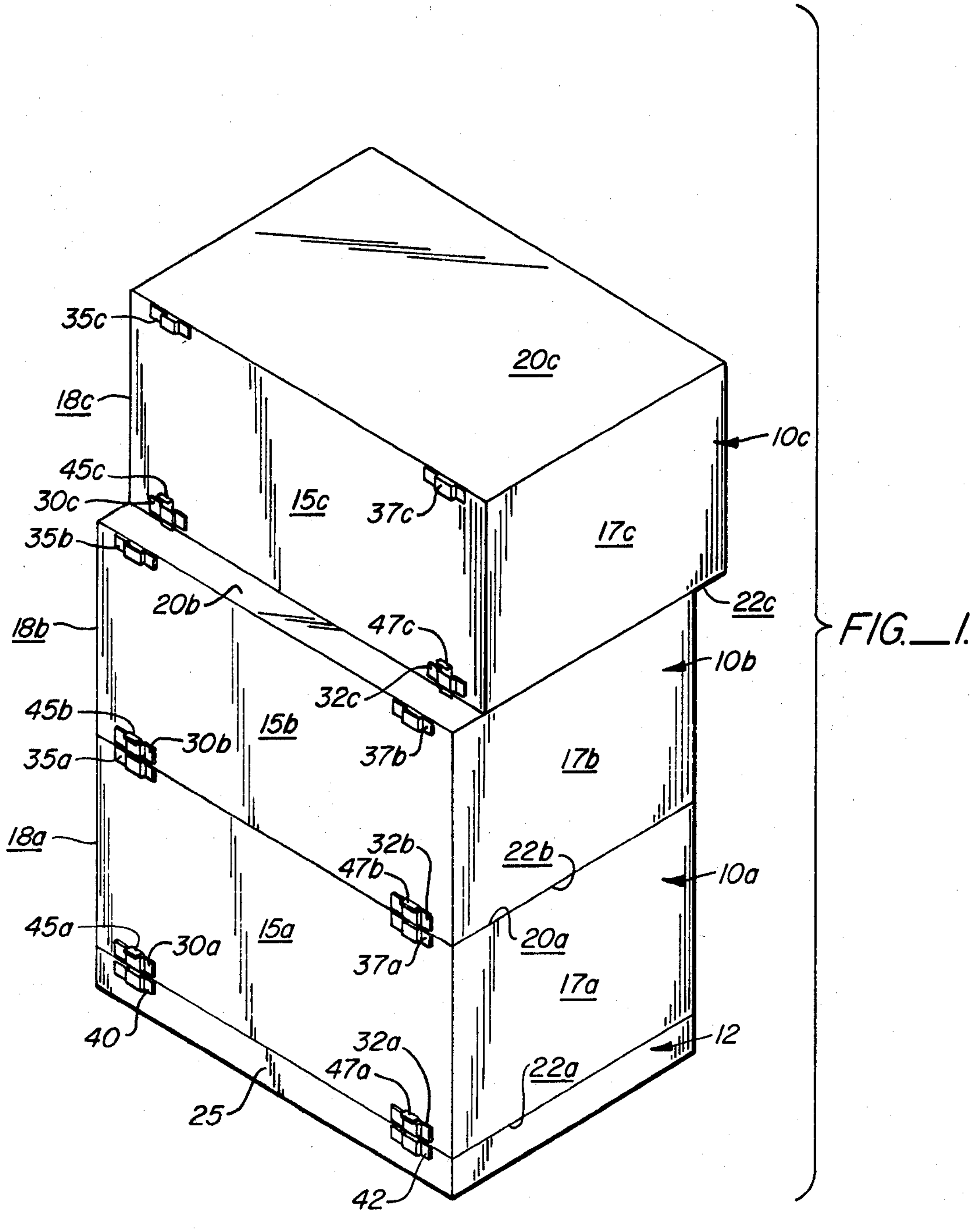
FIG. 1 is an isometric view illustrating the safe deposit box nest anchoring system according to the present invention.

FIG. 1 is an isometric view illustrating the installation and locking together of a plurality of safe deposit box nests 10*a*, 10*b*, and 10*c* in a bank vault. Nests 10*a–c* are stacked in overlying registration atop a base 12 which is anchored to the floor of the vault. Nests 10*a–c* are metal enclosures having respective rear walls 15*a–c*, side walls 17*a–c* and 18*a–c*, top surfaces 20*a–c*, and bottom surfaces 22*a–c*. In an illustrative context, nests 10*a–c* are constructed from ¼-inch thick mild steel. Each nest encloses a plurality of compartments, each of which has a double locking door (not shown) at the front of the nest. Although dimensions vary from one banking institution to another, a horizontal depth of 24 inches is standard, with a width of 35⅝ inches and a height of 17 inches (as used by at least one banking institution), being considered representative. Base 12 has a rear surface 25. In the present context, the significance of the designation rear is that rear walls 15*a–c* and rear surface 25 are located within about one inch of the vault's concrete wall.

As can be seen in FIG. 1, nests 10*b*, 10*a* and base 12 are maintained in precise overlying registration by a bracket and tab arrangement to be described below. Nests 10*a–c* carry respective first lower retainer brackets 30*a–c* and respective second lower retainer brackets 32*a–c* mounted at a predetermined spacing proximate the respective lower edges of rear walls 15*a–c*. Additionally, nests 10*a–c* carry respective first upper retainer brackets 35*a–c* and respective second upper retainer brackets 37*a–c* mounted at the same predetermined spacing proximate the respective upper edges of the rear walls 15*a–c*. Base 12 carries first and second retainer brackets 40 and 42 mounted at the same predetermined spacing proximate the upper edge of rear surface 25.

First lower retainer brackets 30*a–c* have associated therewith respective securing tabs 45*a–c* while second lower retainer brackets 32*a–c* have associated therewith respective second securing tabs 47*a–c*.

Figure 2:
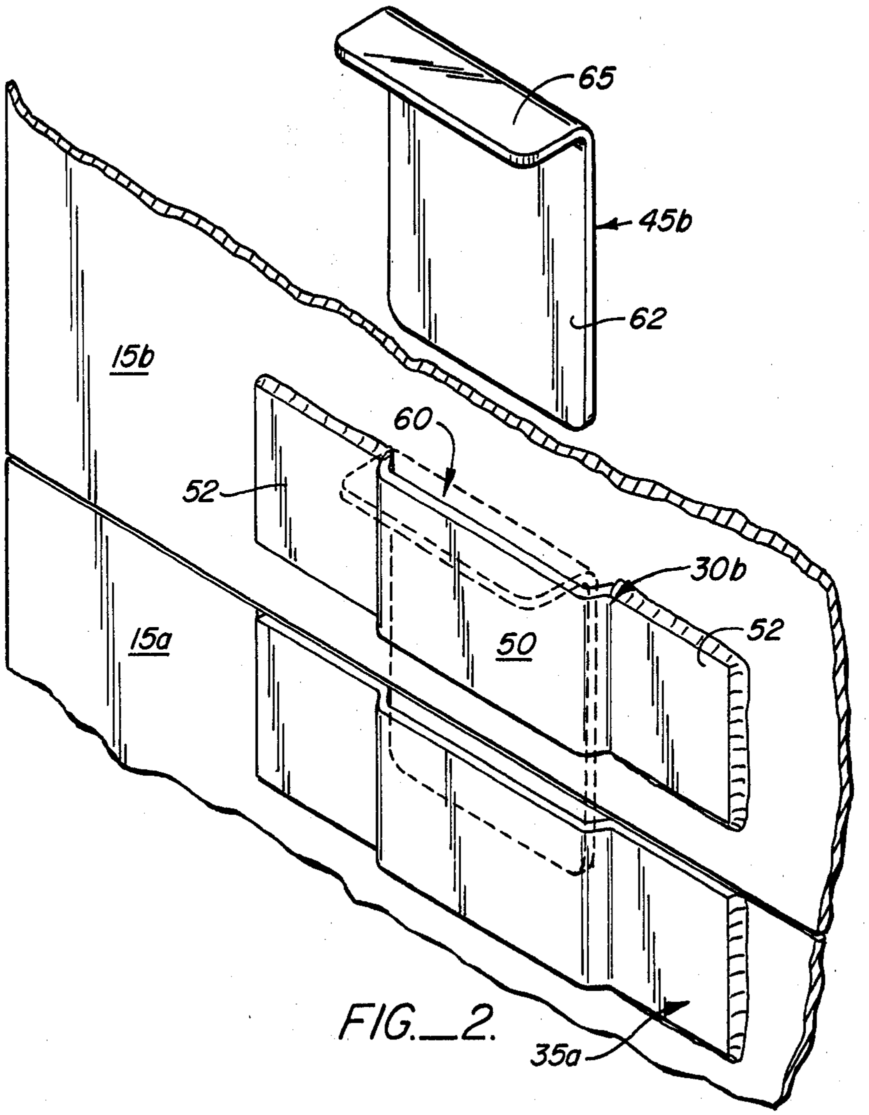
FIG. 2 is a detailed isometric view of the locking mechanism according to the present invention.

The detailed configuration and operation of the retainer brackets and securing tabs may be understood with additional reference to FIG. 2 which is an enlarged isometric view showing the cooperation of retainer brackets 35*a* and 30*b* and securing tab 45*b*. Each retainer bracket is of stepped construction and includes a center portion 50 and paired flanking side portions 52. Side portions 52 are mounted directly to the rear walls and support center portion 50 at a location spaced apart from the wall. The retainer brackets are preferably made of steel, with side portions 52 being welded to the wall. In alternate, equally suitable embodiments, side portions 52 may be bolted (tapped holes in the rear wall) or epoxied to the rear wall.

With nest 10*b* situated atop nest 10*a* in precise overlying registration, lower retainer brackets 30*b* and 32*b* on nest 10*b* are precisely registered with upper retainer brackets 35*a* and 37*a* on nest 10*a*. As can be seen in FIG. 2, the registration of retainer brackets 35*a* and 30*b* defines a vertically extending passageway 60. In the preferred embodiment, tab 45*b* (as well as the other securing tabs) includes a vertical planar portion 62 and a horizontal flange portion 65. Planar portion 62 is configured to provide a free sliding fit into passageway 60 while flange 65 limits the downward movement of the tab as it slides downwardly due to its own weight.

The precise dimensions of the retainer brackets and securing tabs are not critical, although, as will be seen below, the preferred removal procedure implies certain dimensional constraints on the system. For definiteness, a preferred set of dimensions will be set forth, it being understood that wide variation in most dimensions is possible. Retainer bracket 30*b* is preferably formed from 14 gauge (0.0747 inch) thick steel and is approximately one inch high and 3⅞ inches wide, with center portion 50 being sized to define a width of approximately 1⅝ inches for passageway 60. Securing tab 45*b* may also be formed from 14 gauge steel, with planar portion 62 being approximately 2 inches high by 1½ inches wide. Flange 65 extends approximately ½-inch from planar portion 62. Upper brackets 35*a–c* and 37*a–c* are mounted with their upper edges generally flush with the upper edge of the associated nest while lower retainer brackets 30*a–c* and 32*a–c* are mounted with their respective lower edges approximately ½-inch above the lower edge of the associated nest. Thus, as the tab occupies the passageway, there is approximately a ½-inch downward extension of the tab below the confronting surfaces of the nests. The significance of this ½-inch dimension will be described below in connection with the removal procedure.

Installation of the locking system according to the present invention may be understood with reference to FIG. 1. In FIG. 1, nests 10*a* and 10*b* are already registered and locked while nest 10*c* is in the process of being positioned. The positioning procedure occurs as follows. Nest 10*c* is first placed atop nest 10*b* with side walls 17*c* and 18*c* of nest 10*c* in coplanar relationship with side walls 17*b* and 18*b* of nest 10*b*. However, nest 10*c* is not yet pushed all the way back to bring rear wall 15*c* into coplanarity with rear wall 15*b*. At any convenient time, such as prior to placing nest 10*c* atop nest 10*b*, tabs 45*c* and 47*c* are placed in respective lower retainer brackets 30*c* and 32*c*. With nest 10*c* atop nest 10*b*, tabs 45*c* and 47*c* do not fully seat within their respective retainer brackets, but rather are impeded from full downward travel by top surface 20*b* of underlying nest 10*b*. Nest 10*c* is then moved back. As soon as the rear walls of the two nests become coplanar, tabs 45*c* and 47*c* gravitationally drop fully downward into underlying upper retainer brackets 35*b* and 37*b* to effect a positive lock.

Figures 3A, 3B, 3C:
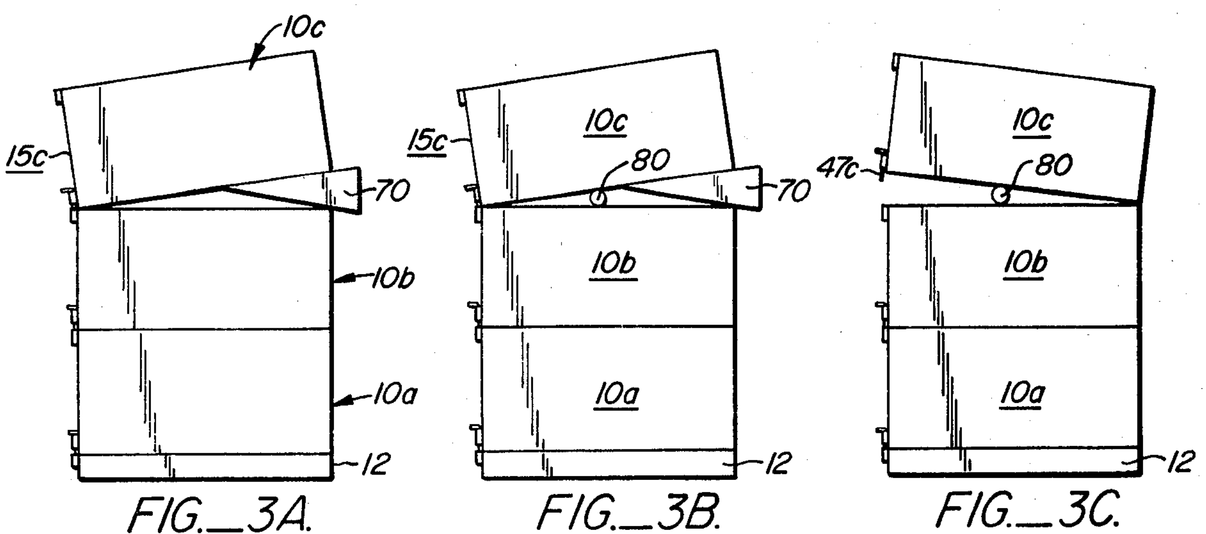
FIGS. 3A–C are schematic side elevational views illustrating a preferred procedure for separating and removing the nests.

FIGS. 3A–C are schematic side elevational views illustrating a preferred procedure for removing nest 10*c*, assumed to have been previously in position. With reference to FIG. 3A, the first step of the procedure involves driving a steel wedge 70 from the front in order to raise the front end of nest 10*c*. Nest 10*c* thus pivots about the lower edge of rear wall 15c. The amount of angular rotation is not so great as to cause bending of tabs 45c and 47c that align nests 10b and 10c.

With reference to FIG. 3B, a steel roller 80 is then placed in the space between the nests approximately half way back, and wedge 70 removed. A ½-inch diameter roller is a convenient size. Then, as seen in FIG. 3C, the front of nest 10c is moved downwardly, so that the nest pivots about roller 80 which acts as a fulcrum. This rotation raises tabs 45c and 47c out of upper retainer brackets 35b and 37b of nest 10b. It has been found that a ½-inch extension of the tabs beneath the lower surface of the nest is sufficiently small that nest 10c may be pulled forward without interference from the tabs. At the same time, the ½-inch extension provides enough incursion into the underlying retainer brackets to provide adequate horizontal stabilization. The tabs are then removed at any convenient time when they are accessible.

In summary it can be seen that the present invention provides a surprisingly simple and effective system for achoring sage deposit box nests to prevent horizontal shifting of one nest relative to another. The system does not require access to the inside of the nest for locking or unlocking, nor does it require access to the rear walls of the nests when they are in position. Furthermore, the system may be applied to safe deposit box nests of virtually any design. Therefore, the retainer brackets and tabs can form the basis of a kit for retrofitting existing safe deposit box installations.

While the above provides a full and complete disclosure of the preferred embodiments of the invention, various modifications, alternate constructions, and equivalents may be employed without departing from the true spirit and scope of the invention. For example, while each rear wall edge is disclosed as being provided with two retainer brackets, larger numbers of retainer brackets could also be used. Moreover, while steel is preferred, other materials may be used. Therefore, the above description and illustrations should not be construed as limiting the scope of the invention, which is defined by the appended claims.

What is claimed is:

1. A method of separating an upper safe deposit box nest that is registered over a lower safe deposit box nest, said upper nest being fitted with first and second lower retainer brackets proximate a lower edge of a rear wall thereof at a predetermined spacing, said lower nest being fitted with first and second upper retainer brackets proximate an upper edge of a rear wall thereof at the same predetermined spacing, said upper and lower nests being horizontally stabilized with respect to one another by first and second tabs in the passageways defined by said registered first upper and lower retainer brackets and said second upper and lower retainer brackets, said method comprising:

inserting a wedge between said nests at the front thereof to cause said upper nest to pivot about said lower edge of said rear wall;

inserting a roller into the space between said upper and lower nests at a position generally approximately halfway between the front and rear thereof;

pivoting said upper nest about the fulcrum defined by said roller to lift said first and second tabs completely above the upper surface of said lower nest; and moving said upper nest toward the front of said lower nest to effect the removal of said upper nest.

2. The method of claim 1 wherein the diameter of said roller corresponds to the distance that said tabs protrude below the lowermost surface of said upper nest.

3. A method of separating an upper safe deposit box nest that is registered over a lower safe deposit box nest, said upper deposit box nest being fitted with first and second lower retainer brackets proximate a lower edge of a rear wall thereof at a predetermined spacing, said lower nest being fitted with first and second upper retainer brackets proximate an upper edge of a rear wall thereof at the same predetermined spacing, said upper and lower nests being horizontally stabilized with respect to one another by first and second locking elements in the passageways defined by said registered first upper and lower retainer brackets and said second upper and lower retainer brackets, said method comprising:

raising the front of said upper nest to cause said upper mest to pivot about said lower edge of said rear wall;

placing a fulcrum in the region between said upper nest and lower nest; and lowering the front of said upper nest to cause said upper nest to pivot about said fulcrum to disengage said first and second locking elements from said first and second upper retainer brackets on said lower nest.

4. The method of claim 3 wherein said step of providing a fulcrum comprises the step of inserting a roller into the space between said upper and lower nests at a position generally approximately halfway between the front and rear thereof.

5. The method of claim 4, and further comprising the step of moving said upper nest toward the front of said lower nest utilizing said roller to facilitate movement of said upper nest.

6. A system for securing and separating stacked safe deposit box nests including an upper safe deposit box nest and a lower safe deposit box nest comprising:

first and second lower retainer brackets disposed proximate a lower edge of a rear wall of said upper nest at a predetermined spacing;

first and second upper retainer brackets disposed proximate an upper edge of a rear wall of said lower nest at said predetermined spacing;

said first and second upper and lower retainer brackets being horizontally located such that registration of said upper and said lower nests causes registration of said first upper and lower retainer brackets to define a first vertically extending passageway and registration of said upper and lower retainer brackets to define a second vertically extending passageway;

first and second locking elements configured for a sliding fit into said first and second passaageways, respectively, to prevent relative horizontal motion of said nests when said locking elements occupy said passageways;

a wedge insertable between respective front portions of said upper and lower nests to cause said upper nest to pivot about said lower edge of said rear wall; and a roller sized relative to said wedge for insertion into the space between said upper and lower nests at a position generally approximately halfway between the front and rear thereof;

said wedge and roller being sized relative to said locking elements such that pivoting said upper nest about the fulcrum defined by said roller lifts said first and second locking elements completely above the upper surface of said lower nest to allow said upper nest to be moved towards the front of the lower nest to effect the removal of said upper nest.

7. A method of stabilizing an upper safe deposit box nest with respect to a lower safe deposit box nest, comprising the steps of:

providing first and second lower retainer brackets disposed proximate a lower edge of a rear wall of said upper nest at a predetermined spacing;

providing first and second upper retainer brackets disposed proximate an upper edge of a rear wall of said lower nest at said predetermined spacing;

said first upper and lower retainer brackets, when registered, defining a first vertically extending passageway;

said second upper and lower retainer brackets, when registered, defining a second vertically extending passageway;

providing first and second locking elements sized for a free sliding fit into said first and second passageways, respectively;

placing said locking elements in said lower retainer brackets such that said locking elements contact an upper surface of said lower nest; and moving said upper nest into a position of registration such that said locking elements drop gravitationally into engagement with said upper retainer brackets on said lower nest.

* * * * *